US006721701B1

(12) United States Patent
Goss et al.

(10) Patent No.: US 6,721,701 B1
(45) Date of Patent: Apr. 13, 2004

(54) METHOD AND APPARATUS FOR SOUND DISCRIMINATION

(75) Inventors: Stephen Clifford Goss, Wheaton, IL (US); Jeffrey Ross Light, Lincolnwood, IL (US); Reginald JuVann Hill, Chicago, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/399,604

(22) Filed: Sep. 20, 1999

(51) Int. Cl.[7] .............................................. G10L 15/00

(52) U.S. Cl. ....................................... 704/231; 704/500

(58) Field of Search ................................ 704/201, 219, 704/221, 231, 237, 238, 239, 243, 251, 500, 501

(56) References Cited

U.S. PATENT DOCUMENTS

| | | | | | |
|---|---|---|---|---|---|
| 4,963,034 | A | * | 10/1990 | Cuperman et al. | 704/219 |
| 5,119,423 | A | * | 6/1992 | Shiraki et al. | 704/219 |
| 5,305,421 | A | * | 4/1994 | Li | 704/219 |
| 5,675,709 | A | * | 10/1997 | Chiba | 704/278 |
| 5,715,362 | A | * | 2/1998 | Vanska | 704/201 |
| 5,719,992 | A | * | 2/1998 | Shoham | 704/219 |
| 5,742,930 | A | * | 4/1998 | Howitt | 704/502 |
| 5,768,474 | A | * | 6/1998 | Neti | 704/235 |
| 5,832,425 | A | * | 11/1998 | Mead | 704/221 |
| 5,839,109 | A | * | 11/1998 | Iwamida | 704/271 |
| 5,909,662 | A | * | 6/1999 | Yamazaki et al. | 704/221 |
| 5,950,155 | A | * | 9/1999 | Nishiguchi | 704/230 |
| 5,970,446 | A | * | 10/1999 | Goldberg et al. | 704/233 |
| 6,161,091 | A | * | 12/2000 | Akamine et al. | 704/258 |
| 6,219,641 | B1 | * | 4/2001 | Socaciu | 704/251 |

* cited by examiner

*Primary Examiner*—Daniel Abebe

(57) ABSTRACT

A sound discriminator (107, 207) in accordance with the invention distinguishes or emphasis a specific audio signal or class or audio signals. The sound discriminator is employed in a digital audio encoding and/or decoding process. A comparator (110, 210) within the sound discriminator compares a received representation of an audio signal with a stored representation (112, 212) of a desired signal. An error between the two signals is determined and if the error is within an acceptable range, the stored representation of the desired signal replaces the actual received representation of the audio signal in an encoded or decoded stream of data. In this manner, a desired signal within an encoded or decoded signal is discriminated.

12 Claims, 5 Drawing Sheets

METHOD AND APPARATUS FOR SOUND DISCRIMINATION

FIELD OF THE INVENTION

The present invention relates generally to audio encoding and decoding, and in particular, to a method and apparatus for encoding and decoding audio signals to emphasize and discriminate select sounds.

BACKGROUND OF THE INVENTION

The advantages of processing audio signals digitally are known. In many applications compression is used when processing audio signals digitally to accommodate the bandwidth requirements of a communications channel or the storage limitations of a system. Compression is accomplished by numerous means that reduce the amount of data required to reproduce a sound. In general, an encoder exploits redundancy or some negligible perception quality to reduce the amount of digital data needed to reproduce an audio signal. A decoder reverses the encoding process to reproduce the audio signal.

In a system using compressed audio, unwanted background noise is a problem. In particular, since some information is generally lost in the compression process, noise may make an audio signal incomprehensible or otherwise undesirable after compression. Filtering techniques are employed to reduce noise, but these techniques generally filter based on frequency and signal level thresholds. Frequency based filtering is inadequate where the noise is at or near the sound level and frequency of the audio signal of interest.

In many applications a specific audio signal or class of signals must be perceived. For example, the sound of coins dropping in a payphone needs to be distinguished from background noise. Surveillance systems may need to monitor a particular sound related to an event under surveillance. Certain speech may need to be distinguished from background noise. Conventional compression techniques and filtering do not provide an adequate means to distinguish or emphasize a particular sound among other sounds.

Therefore, a need exists for a method and apparatus to distinguish or emphasize a specific audio signal or class of audio signals.

SUMMARY OF THE INVENTION

In accordance with the present invention, a specific sound is discriminated or distinguished within an audio encoder or decoder. This is accomplished by referring to a code table storing a plurality of audio samples representing the specific sound to be discriminated.

In one aspect of the present invention, an apparatus for encoding audio signals employs techniques to discriminate a specific sound. The apparatus includes an analog-to-digital converter that converts an audio signal to a stream of digital audio samples. An encoder receives the stream of digital audio samples and encodes the samples to produce an encoded stream of audio samples. After encoding, a comparator compares a predetermined number of samples from the encoded stream of audio samples with a predetermined number of samples from a code table. The code table stores audio samples relating to a specific audio signal to be discriminated. The comparator locates the audio samples in the code table that are closest to the predetermined number of samples from the encoded stream of audio samples and a discriminator determines whether it is more favorable to use the encoded audio samples or the samples from the code table. This determination selects a discriminated group of samples. In variations of the invention the comparator and discriminator precede the encoder or the comparator and discriminator are coupled between two encoders. Multiple code tables are provided relating to different specific sounds. The code tables are selectable by a user of the apparatus.

In another aspect of the present invention an apparatus for decoding audio signals employs techniques to discriminate a specific sound. The apparatus includes a decoder that receives and decodes an encoded stream of audio to produce a stream of decoded audio samples. A comparator compares a predetermined number of decoded audio samples from the stream of decoded audio samples to a predetermined number of samples in a code table. The comparator locates the audio samples in the code table that are closest to the predetermined number of decoded audio samples and determines a difference between the selected samples from the code table and the predetermined number of decoded audio samples. A discriminator uses the difference to select either the decoded audio samples or the samples from the code table as discriminated samples. The discriminate samples are received by a digital-to-analog converter that renders the discriminated samples into an audio signal. In variations of the invention the comparator and discriminator precede the decoder or the comparator and discriminator are coupled between two decoders. Also, multiple code tables are provided relating to different specific sounds and the code tables are selectable by a user of the apparatus.

Code tables storing audio samples of desired sounds to be discriminated are created by receiving a desired sound to be discriminated. The desired sound is preferably mixed with noise, including random or predetermined noise, to produce a mixed input signal. The mixed input signal is digitized to produce a digitized input signal. A filter with adjustable parameters is used to filter the digitized input signal to produce a plurality of audio samples that are stored. The plurality of audio samples are converted to an audio signal that is compared with the desired sound. If the audio signal is acceptable, the plurality of audio samples are stored as a code table for the desired sound. If the audio signal is not acceptable, the process is repeated employing different filter parameters until the audio signal produced is acceptable. The plurality of audio samples relating to the acceptable audio signal are stored as code table entries for discriminating the desired sound.

DETAILED DESCRIPTION OF THE PREFERRED EMBODIMENTS

Figure 1:
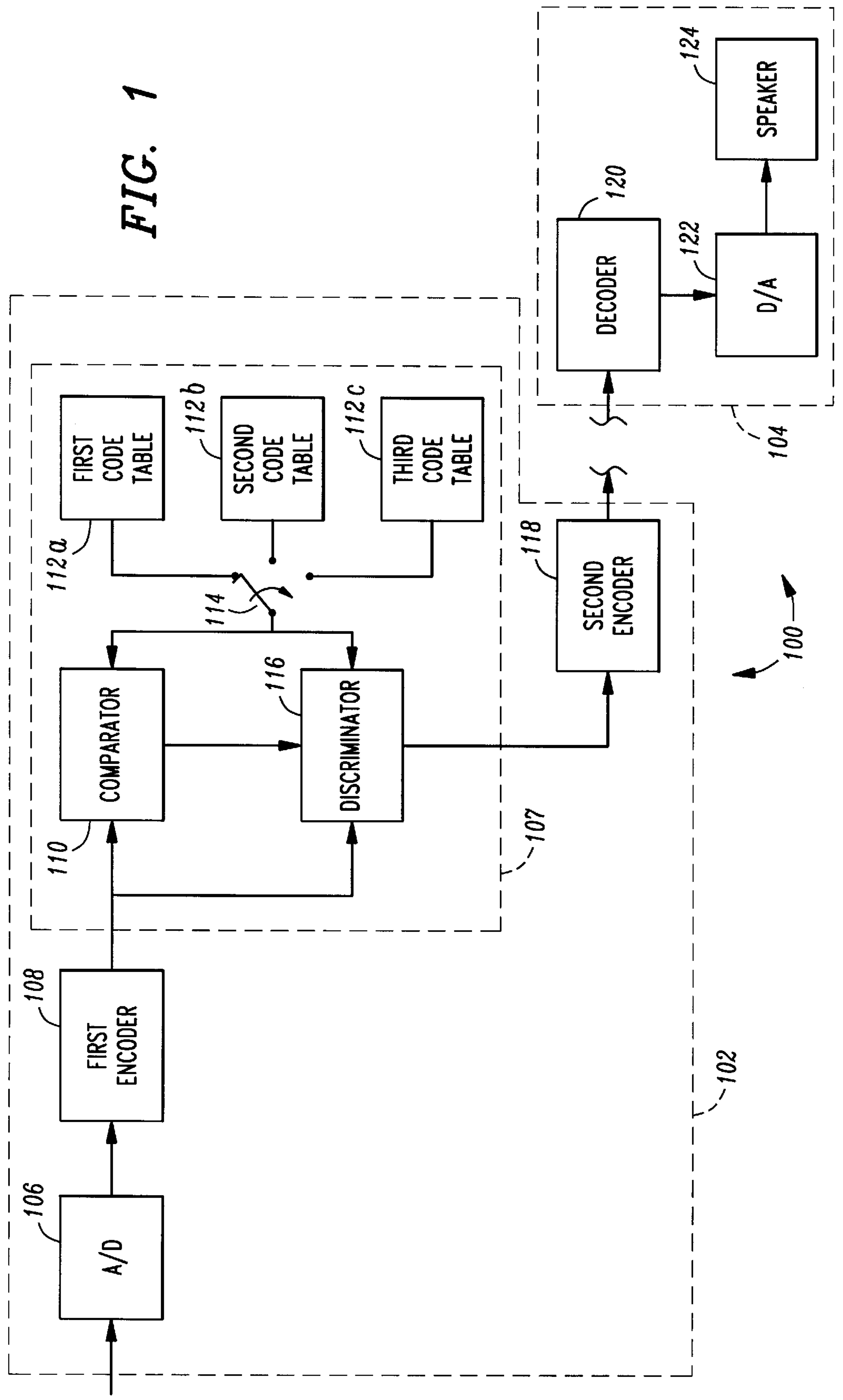
FIG. 1 is a block diagram of an audio encoding and decoding system with an encoder employing a sound discriminator in accordance with the present invention.

FIG. 1 is a block diagram of an encoding and decoding system 100 in accordance with the present invention. Encoding and decoding system 100 includes an encoder system 102 and a decoder system 104. Encoder system 102 converts an analog audio signal into an encoded digital audio stream. The encoded digital audio stream is received by decoder system 104. Decoder system 104 decodes the encoded digital audio stream, converts the resulting digital signal to an analog audio signal and renders the audio signal audible. Preferably, encoder system 102 and decoder system 104 are directly connected. Alternatively, a communications channel or storage medium (not shown) interconnects encoder system 102 with decoder system 104.

Encoder system 102 includes an analog-to-digital converter 106, a first encoder 108, a sound discriminator 107 and a second encoder 118. Analog-to-digital converter 106 receives an analog audio signal from a source (not shown) and converts the audio analog signal into a stream of digital samples. The source that provides the audio signal to analog-to-digital converter 106 may provide filtering, such as acoustic filtering, high-frequency filtering or bandpass filtering. First encoder 108 receives the stream of digital samples and encodes the stream of digital samples to produce a stream of encoded digital samples. First encoder 108 alternatively uses a variety of techniques for encoding the stream of digital audio samples. Preferably, the first encoder 108 employs an algorithm that compresses or reduces the amount of digital data required to represent the stream of digital audio data. Sound discriminator 107 receives the stream of encoded digital samples from the first encoder 108 and, in accordance with the present invention, produces a discriminated stream of data. Second encoder 118 receives the discriminated stream of data and further encodes the discriminated stream of data to produce an encoded digital audio stream.

Sound discriminator 107 includes a comparator 110, a plurality of code tables 112*a–c*, and a discriminator 116. Comparator 110 receives the stream of encoded digital samples from the first encoder 108. Comparator 110 also has access to the plurality of code tables 112*a–c*, which are shown in FIG. 1 as a first code table 112*a*, a second code table 112*b*, and a third code table 112*c*. A switch 114 determines which one of the plurality of code tables 112*a–c* is available to comparator 110. In FIG. 1, first code table 12*a* is shown selected by switch 114. Switch 114 is preferably under control of a user. In accordance with the present invention, the plurality of code tables 112*a–c* store audio samples associated with a sound to be discriminated. The content of the plurality of code tables 112 is discussed further below with respect to FIG. 3

Comparator 110 compares the stream of encoded digital samples received from first encoder 108 with the values stored in the selected code table 112*a*. Comparator 110 alternatively looks at one encoded digital sample from the first encoder or a group of samples from the first encoder. The comparator searches the selected code table 112*a* for audio samples that are similar to the samples from first encoder 108. This is preferably accomplished by determining a difference between the samples from first encoder 108 and samples from the selected code table 112*a*. The difference represents an error. In effect, comparator 110 determines whether the encoded digital samples from encoder 108 are similar to a sound to be discriminated that is stored in selected code table 112*a*.

Discriminator 116 receives the error from comparator 110. Discriminator 116 determines whether the error is acceptable. If the error is acceptable, the values from the code table 112*a* are placed into the encoding process by discriminator 116 as a replacement for the actual stream of encoded digital audio from first encoder 108. In other words, if the error indicates that the stream of encoded digital samples is sufficiently close to a portion of the desired sound stored in code table 112*a*, then the portion of the desired sound, rather than the actual encoded sound, is placed in the encoding process and incorporated into the encoded audio stream. Discriminator 116 receives the actual stream of encoded digital samples from first encoder 108 as well as the samples from the selected code table 112*a*. Based upon the error from comparator 110, discriminator 116 passes either the stream of encoded digital samples from first encoder 108 or the code table values from code table 112*a* to second encoder 118. In a preferred embodiment, the error from comparator 110 is permitted to be large enough that only code table values, rather than encoded digital samples, are the output of discriminator 116.

Second encoder 118 encodes its input to produce an encoded digital audio stream. The input to second encoder 118 is determined by discriminator 116 and is alternatively, the actual stream of encoded digital samples or audio samples from the selected code table 112*a*. This output from discriminator 116 is a discriminated stream of data.

Decoder system 104 includes a decoder 120, a digital-to-analog converter 122, and a speaker 124. Decoder 120 receives an encoded digital audio stream and decodes that audio stream into a stream of digital audio samples. Decoder 120 reverses the encoding done by encoding system 102. Digital-to-analog converter 122 receives the stream of digital audio samples created by decoder 120. Digital-to-analog converter 122 converts the stream of digital audio samples into an analog audio signal that is rendered audible by speaker 124.

In FIG. 1, encoding system 102 includes both a first encoder 108 and a second encoder 118. The sound discrimination accomplished by sound discriminator 107, in effect, is in the midst of the encoding process jointly performed by first encoder 108 and second encoder 118. In variations of the invention, either first encoder 108 or second encoder 118 is eliminated. If first encoder 108 is not included in encoding system 102, then the sound discrimination accomplished by sound discriminator 107 precedes encoding of the stream of digital samples from analog-to-digital converter 106. In this arrangement, the plurality of codes tables 112*a–c* store audio samples representative of the desired sound without benefit of an encoding algorithm.

On the other hand, if second encoder 118 is not included with an encoding system 102, the sound discrimination accomplished by sound discriminator 107 is accomplished after the digital audio samples are encoded by first encoder 108. In this arrangement, the code tables 112*a–c* store the desired sound in a form comparable to the desired sound after being subjected to an encoding algorithm used by first encoder 108.

Sound discriminator 107 is preferably implemented with a digital signal processor, a microprocessor or a general-purpose computer and a stored program. Alternatively, sound discriminator 107 is implemented using combinatorial and sequential logic elements.

Figure 2:
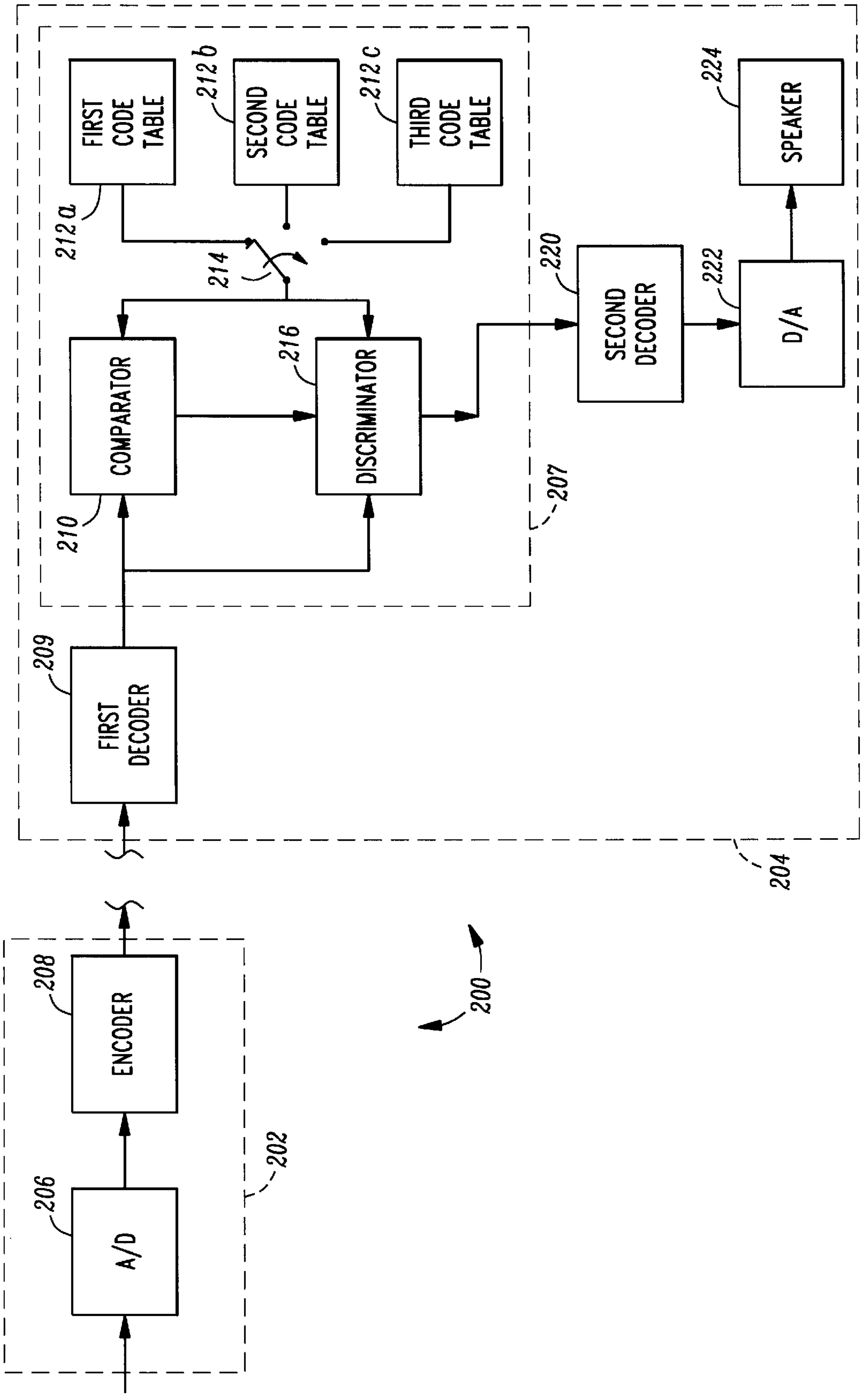
FIG. 2 is a block diagram of an audio encoding and decoding system with a decoder employing a sound discriminator in accordance with the present invention.

FIG. 2 is a block diagram of an encoding and decoding system 200 in accordance with the present invention. Encoding and decoding system 200 includes an encoding system 202 and a decoding system 204. Encoding system 202 receives an analog audio signal from a source (not shown) and encodes that audio signal into a stream of encoded audio data. Decoding system 204 receives a stream of encoded audio data and decodes that audio data into an audio signal and renders the audio signal audible. Decoding system 204 reverses the encoding processing performed by encoding system 202. Generally, a communications channel or storage medium (not shown) is provided between encoding system 202 and decoding system 204. Alternatively, the output of encoding system 202 is directly connected to the input of decoding system 204.

Encoding system 202 includes an analog-to-digital converter 206 and an encoder 208. Analog-to-digital converter 206 receives an analog audio signal and converts that analog audio signal into a stream of digital audio samples. Encoder 208 receives the stream of digital audio samples and encodes the digital audio samples into encoded audio data. Encoder 208 may implement a variety of algorithms for encoding digital audio samples from analog-to-digital converter 206. Preferably, encoder 208 implements a lossy compression algorithm. The audio data may be limited to speech or may include stereo audio data. Preferably, encoder 208 reduces the amount of data needed to represent the audio signal by exploiting redundancy and perceptual qualities associated with the audio signal.

Decoding system 204 includes a first decoder 209, a sound discriminator 207, a second decoder 220, a digital-to-analog converter 222 and a speaker 224. First decoder 209 receives encoded audio data and decodes the encoded audio data into decoded audio samples. Sound discriminator 207 receives the decoded audio samples from first decoder 209 and, in accordance with the present invention, produces a stream of discriminated audio samples. Second decoder 220 receives the stream of discriminated audio samples and further decodes the discriminated audio samples to produce digitized audio samples. The digitized audio samples are received by digital-to-analog converter 222, which converts the digital signals to analog signals so that speaker 224 may render them audible.

Sound discriminator 207 is similar to sound discriminator 107 employed in encoding system 102 of FIG. 1. Sound discriminator 207 includes a comparator 210, a plurality of code tables 212*a–c* and a discriminator 216. Comparator 210 receives decoded audio samples from first decoder 209. Comparator 210 also receives a plurality of audio samples from a selected one of code tables 212*a–c*. A switch 214 represents the selection of the code table 212 that supplies samples to comparator 210. In FIG. 2, a first code table 212*a*, a second code table 212*b*, and a third code table 212*c* are shown and switch 214 is shown selecting first code table 212*a*. Switch 214 is preferably under control of a user.

Comparator 210 compares the decoded audio samples from first decoder 209 with audio samples from the selected code table 212*a* and determines a difference between the two. More specifically, comparator 210 searches the selected code table 212*a* for an audio sample or group of audio samples that is close to an audio sample or group of decoded audio samples from first decoder 209. After the comparator 210 locates a close sample or group of samples from code table 212*a*, the error or difference between the samples from the code table and the decoded audio samples from first decoder 209 is produced for discriminator 216.

Discriminator 216 produces a discriminated audio sample that is either an audio sample or group of audio samples from the selected code table 212*a* or an actual decoded audio sample or group of decoded audio samples from first decoder 209. The selection of the discriminated audio samples is made based upon the error from comparator 210. Sound discriminator 207, in effect, places the desired sound stored in the selected code table 212*a* in the stream of audio received by decoding system 204 if the actual decoded sample is acceptably similar to the desired sound. In this manner, a desired sound is emphasized or discriminated. In a preferred embodiment, the error from comparator 210 is permitted to be large enough that only code table values, rather than decoded audio samples, are the output of discriminator 216.

In variations of decoding system 204, either first decoder 209 or second decoder 220 is eliminated. In other words, the decoding process is alternatively accomplished before or after sound discrimination, rather than having sound discrimination in the midst of the decoding process, as shown in FIG. 2. In alternatively relocating the sound discrimination process with respect to the decoding process, the contents of the code tables 212*a–c* must be comparable to the input received by sound discriminator 207. For example, if first decoder 209 is not included within decoding system 204, then code tables 212*a–c* must store a desired sound in a format that is comparable to encoded audio data. On the other hand, if first decoder 209 is employed prior to sound discriminator 207, code tables 212*a–c* must store the desired sound in a format that is comparable to the decoded audio samples.

Also, as an alternative to a separate comparator and discriminator, the functions are combined. This arrangement is especially desirable where the determination of whether a sample from the code table is closest to a decoded sample is the same determination used to select the discriminated signal.

Figure 3:
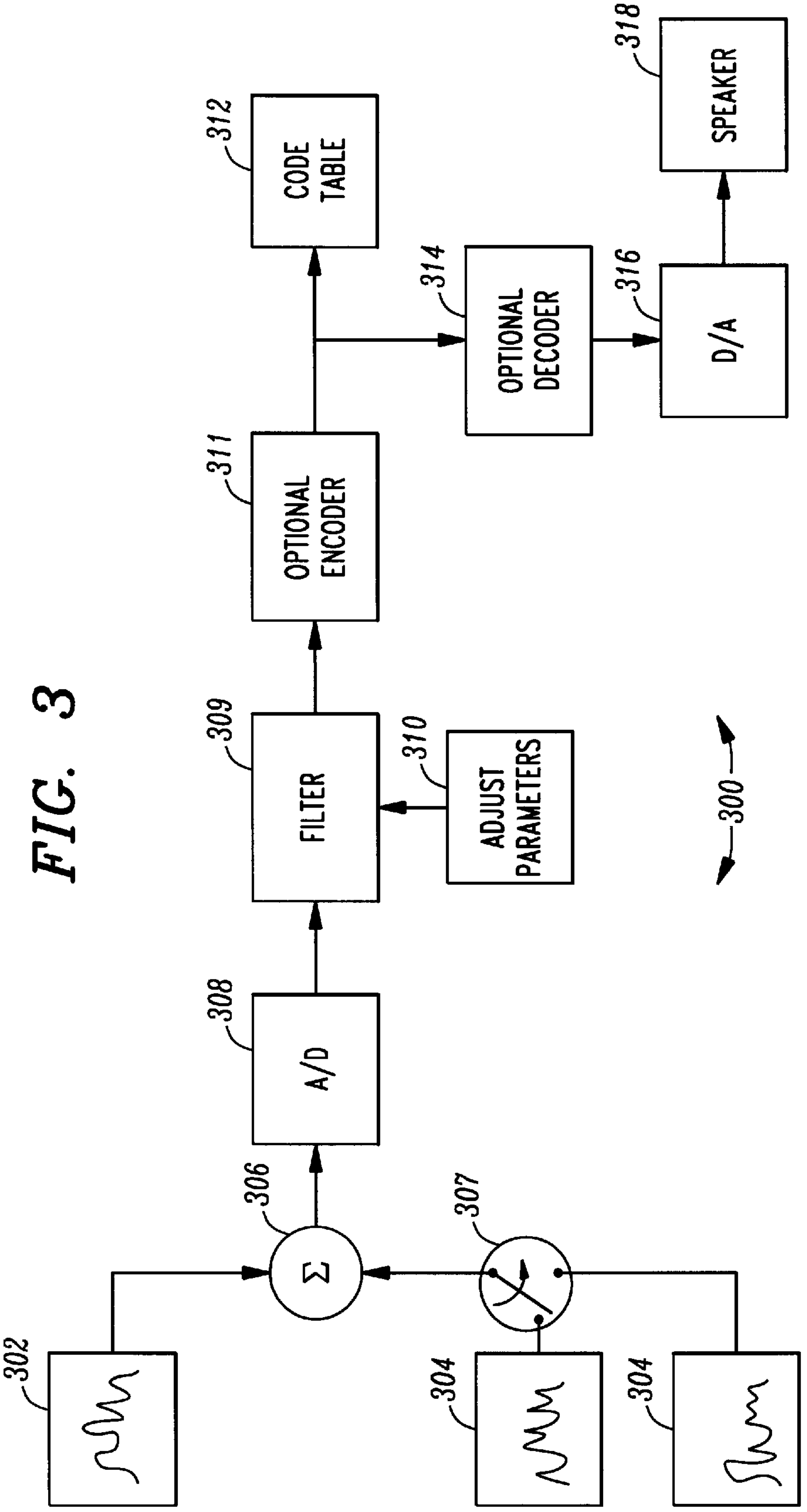
FIG. 3 is a block diagram of an apparatus for creating code tables in accordance with the present invention.

FIG. 3 is a block diagram of an apparatus for creating code tables, for example, code tables 112*a–c* and 212*a–c* of FIG. 1 and FIG. 2, respectively. Code table generator 300 includes a sound mixer 306, an analog-to-digital converter 308, a filter 309 with adjustable parameters 310, an optional encoder 311 and a code table store 312. Mixer 306 mixes a desired sound 302 with noise environments 304. Desired sound 302 is the sound to be discriminated in accordance with the invention. Noise environments 304 are representative of background noise that typically accompanies a sound to be discriminated. Code table store 312 ultimately stores a plurality of samples representative of desired sound 302. Desired sound 302 is alternatively processed in code table generator 300 alone or in combination with noise environments 304.

A switch 307 is used to select one or more of noise environments 304 to be mixed with desired sound 302 by mixer 306. The mixed sound produced by mixer 306 is converted to a digital signal by analog-to-digital converter 308. Analog-to-digital converter 308 produces a stream of digital audio samples. Filter 309 receives the digital audio samples and produces a filtered stream of digital audio samples. Filter 309 has adjustable parameters 310 that affect the output of filter 309. Filter 309 provides spectral or other filtering.

An optional encoder 311 is used to encode the output of filter 309. In particular, if code table store 312 is to store samples that are to be compared with encoded data, then optional encoder 311 is used such that code table store 312 stores data that is comparable with data in the encoded system. On the other hand, optional encoder 311 is not necessary where code table store 312 is used in a sound discriminator that receives unencoded digital audio samples.

Code table generator 300 preferably uses an iterative process to generate code tables. Throughout iterations through code generator 300 the audio samples and the code tables are made audible and the filter used in creating the code table is adjusted until the contents of the code table are acceptable. The code table contents are rendered audible by optional decoder 314, a digital-to-analog converter 316 and a speaker 318. Optional decoder 314 performs the reverse process of optional encoder 311. Of course, where optional encoder 311 is not employed, optional decoder 314 need not be employed. Optional decoder 314 produces a decoded stream of digital audio data that is received by digital-to-analog converter 316. Digital-to-analog converter 316 renders the audio signal audible in conjunction with speaker 318.

As an alternative to making the samples stored in the code table audible, a numeric comparison may be made between the code table contents and a comparable version of desired sound 302. In any event, adjustable parameters 310 are manually or automatically adjusted to generate an acceptable code table.

Figure 4:
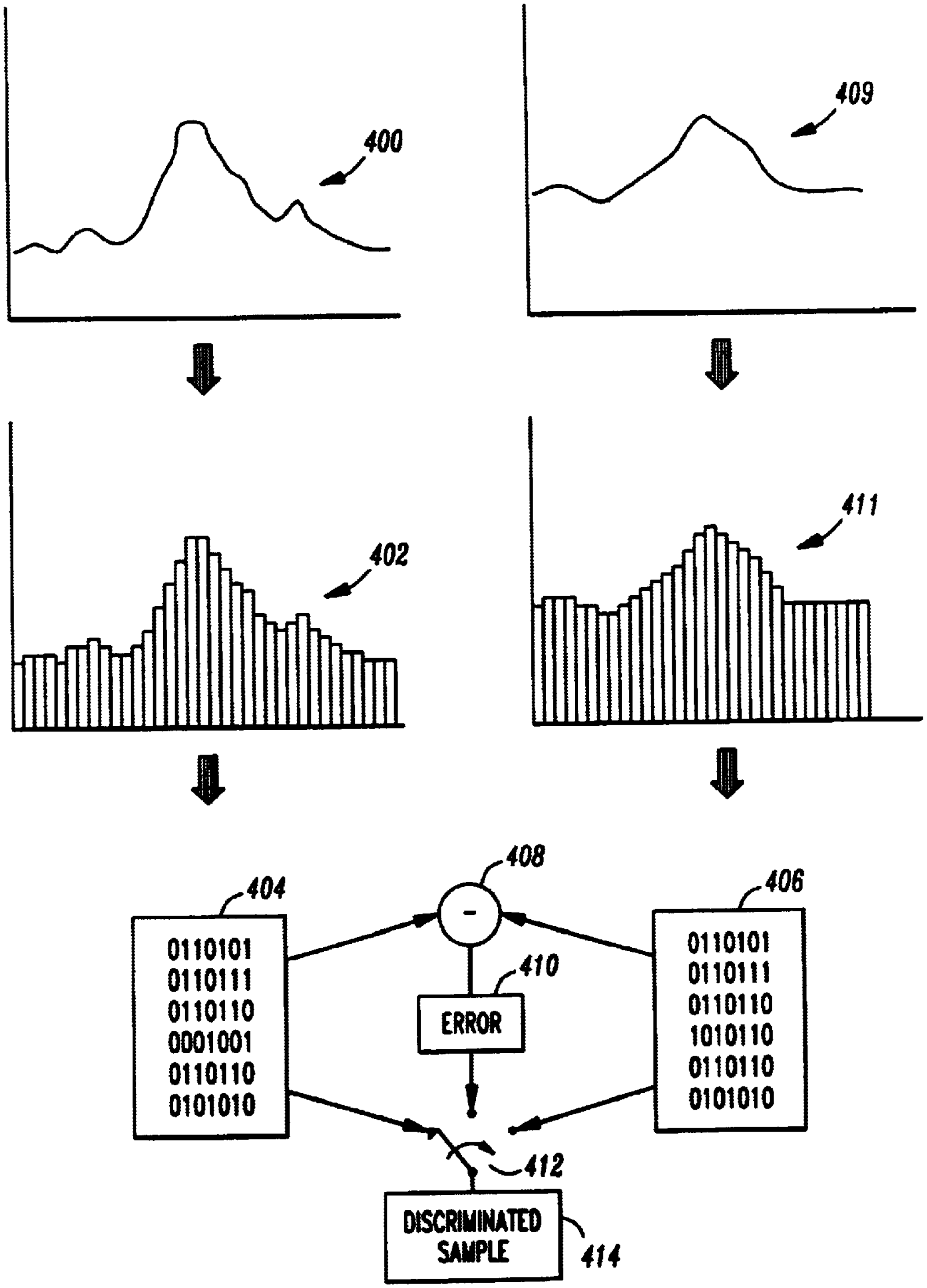
FIG. 4 is a diagram illustrating a method of discriminating sounds in an encoder in accordance with the present invention.

FIG. 4 is a diagram illustrating a method for sound discrimination in accordance with the present invention. In particular, FIG. 4 relates to sound discrimination employed in the encoding process. FIG. 4 is described below with reference to the embodiment of the invention shown in FIG. 1.

An analog audio signal 400 is converted to a stream of digital audio samples 402 by analog-to-digital converter 106. Though shown as a bar chart in FIG. 4, digital audio samples 402 are readily represented as a set of digital values. Digital audio samples 402 are encoded by first encoder 108 into encoded digital audio data 404. Digital audio data 404 is compared with code table data 406 by a comparator 408. In FIG. 4 comparator 408 is shown as a subtraction operation producing a difference or error 410. A switch 412 represents either the selection of the code table data 406 or the encoded audio data 404, the selection being based upon the error 410. The discriminator 116 makes this selection and produces the discriminated audio sample 414 shown in FIG. 4.

Code table data 406 represents a desired sound 409. Desired sound 409 is converted into digital audio samples 411 by a code generator, such as code table generator 300 of FIG. 3. More specifically, desired sound 409 is converted into a stream of digital audio samples 411 by analog-to-digital converter 308 and then filtered and encoded by filter 309 and optional encoder 311 to produce code table data 406.

Figure 5:
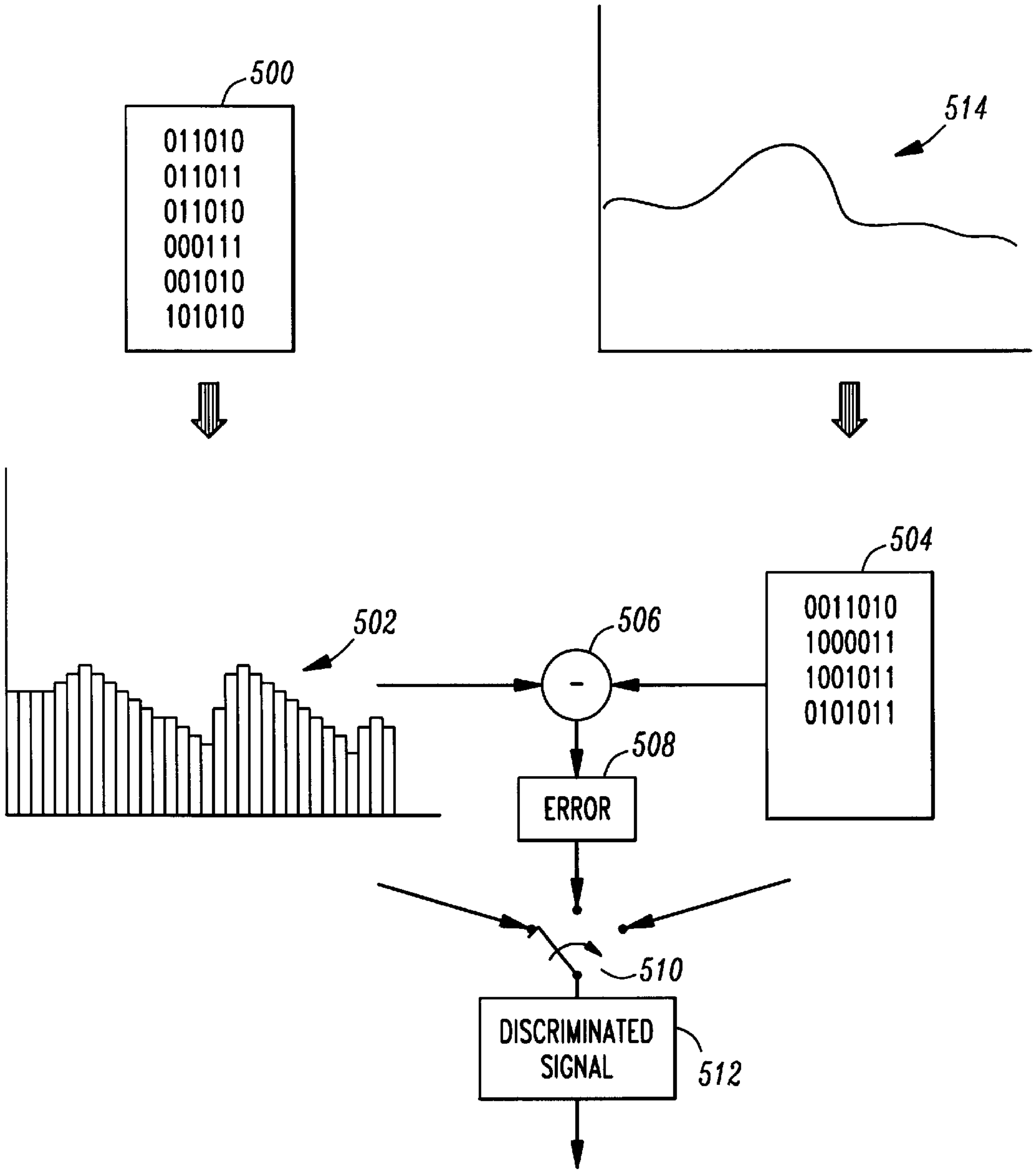
FIG. 5 is a diagram illustrating a method of discriminating sounds in a decoder in accordance with the present invention.

FIG. 5 illustrates a method for sound discrimination in accordance with the present invention. In particular, FIG. 5 relates to sound discrimination employed in the decoding process. FIG. 5 is described below with reference to the embodiment of the invention shown in FIG. 2.

Encoded audio data 500 is shown as binary values. First decoder 209 converts the encoded audio data into decoded audio samples 502. The decoded audio samples 502 are shown as a bar graph but are also readily represented as digital values. Values from a code table 504 representing decoded audio samples for a desired sound 514 are compared with the decoded audio samples 502 by comparator 506. Comparator 506 is shown as a subtraction operation creating a difference or error 508 between the decoded audio samples 502 and a code table 504. A switch 510 represents the selection of either the code table data 504 or the decoded audio samples 502, the selection being based upon the error 508. The discriminator 216 makes this selection and produces the discriminated signal 512 shown in FIG. 5.

A sound discriminator is described above for emphasizing or discriminating a specific or desired sound. The sound discriminator is useful in many applications including speech coding, hearing aids, surveillance systems, telecommunication systems and any other systems where a specific or desired sound must be discriminated.

The invention being thus described, it will be evident that the same may be varied in many ways. Such variations are not to be regarded as a departure from the spirit and scope of the invention and all such modifications are intended to be included within the scope of the appended claims.

What is claimed is:

1. An apparatus for sound discrimination comprising:

an analog-to-digital converter that converts an audio signal to a digital audio sample;

a first encoder coupled to the analog-to-digital converter that encodes the digital audio sample to produce a first encoded audio sample;

a first comparator coupled to the first encoder to receive the first encoded audio sample and compare the first encoded audio sample to a first plurality of predetermined audio samples to produce a first error representing a difference between the first encoded audio sample and one of the first plurality of predetermined audio samples;

a first discriminator that receives the first encoded audio sample, the one of the first plurality of predetermined audio samples, and the first error and selects one of the first encoded audio sample and the one of the first plurality of predetermined audio samples based on the first error to produce a discriminated audio sample;

a first decoder that receives a second encoded audio sample and decodes the second encoded audio sample into a decoded audio sample;

a second comparator coupled to the first decoder to receive the decoded audio sample and compare the decoded audio sample to a second plurality of predetermined audio samples to produce a second error representing a difference between the decoded audio sample and one of the second plurality of predetermined audio samples; and a second discriminator that receives the decoded audio sample, the one of the second plurality of audio samples and the second error and selects one of the decoded audio sample and the one of the second plurality of audio samples based on the second error to produce a discriminated audio sample; and wherein the first plurality of predetermined audio samples and the second plurality of audio samples represents predetermined audio signals that are to be discriminated by the first discriminator and the second discriminator, respectively.

2. The apparatus of claim 1 wherein the first encoder compresses the digital audio sample such that less bits are required to represent the digital audio sample.

3. The apparatus of claim 1 wherein the first and second plurality of predetermined audio signals represent speech.

4. The apparatus of claim 3 wherein the first and second plurality of predetermined audio signals represent a word or phrase.

5. The apparatus of claim 1 further comprising:

a second encoder that encodes the discriminated audio sample to produce an encoded discriminated sample.

6. An apparatus for sound discrimination comprising:

a first decoder that receives an encoded audio sample and decodes the encoded audio sample into a decoded audio sample;

a comparator coupled to the first decoder to receive the decoded audio sample and compare the decoded audio sample to a plurality of predetermined audio samples to produce an error representing a difference between the decoded audio sample and one of the plurality of predetermined audio samples; and a discriminator that receives the decoded audio sample, the one of the plurality of predetermined audio samples and the error and selects one of the decoded audio sample and the one of the plurality of predetermined audio samples based on the error to produce a discriminated audio sample;

wherein the plurality of predetermined audio samples represents predetermined audio signals that are to be discriminated by the discriminator.

7. The apparatus of claim 6 further comprising:

a digital-to-analog converter that converts the discriminated audio sample into a decoded analog audio signal.

8. The apparatus of claim 6 wherein the one of the plurality of predetermined audio samples is closest in value to the decoded audio sample than any other of the plurality of predetermined audio samples.

9. The apparatus of claim 6 further comprising:

a second decoder that decodes the discriminated audio sample into a decoded discriminated audio sample.

10. The apparatus of claim 9 further comprising:

a digital-to-analog converter that converts the decoded discriminated audio sample into a decoded analog audio signal.

11. An apparatus for sound discrimination comprising:

an analog-to-digital converter that converts an audio signal to a stream of digital audio samples;

an encoder coupled to the analog-to-digital converter that encodes the stream of digital audio samples to produce an encoded stream of audio samples;

a comparator coupled to the encoder to receive the encoded stream of audio samples and compare a predetermined number of encoded audio samples from the encoded stream of audio samples to a plurality of predetermined audio samples from a select one of a plurality of code tables to produce an error representing a difference between the predetermined number of encoded audio samples and the plurality of predetermined audio samples; and a discriminator that receives the predetermined number of encoded audio samples, the plurality of predetermined audio samples and the error and selects one of the predetermined number of encoded audio samples and the plurality of predetermined audio samples based on the error to produce a plurality of discriminated audio samples;

wherein the plurality of predetermined audio samples represents predetermined audio signals that are to be discriminated by the discriminator;

wherein each one of the plurality of code tables is loaded with a plurality of audio samples that represent different desired sounds; and wherein the select one of the plurality of code tables is chosen by a user.

12. An apparatus with sound discrimination that produces a stream of encoded data, the apparatus comprising:

an analog-to-digital converter that converts an audio signal to a digital audio sample;

a first encoder coupled to the analog-to-digital converter that encodes the digital audio sample to produce an encoded audio sample;

a comparator coupled to the first encoder to receive the encoded audio sample and compare the encoded audio sample to a plurality of predetermined audio samples to produce an error representing a difference between the encoded audio sample and one of the plurality of predetermined audio samples;

a discriminator that receives the encoded audio sample, the one of the plurality of predetermined audio samples, and the error and selects either one of the encoded audio sample or one of the plurality of predetermined audio samples based on the error to produce a discriminated audio sample;

wherein the plurality of predetermined audio samples represents predetermined audio signals that are to be discriminated by the discriminator; and wherein the discriminated audio sample is incorporated into the stream of encoded data for subsequent decoding.

* * * * *